United States Patent Office 3,464,536
Patented Sept. 2, 1969

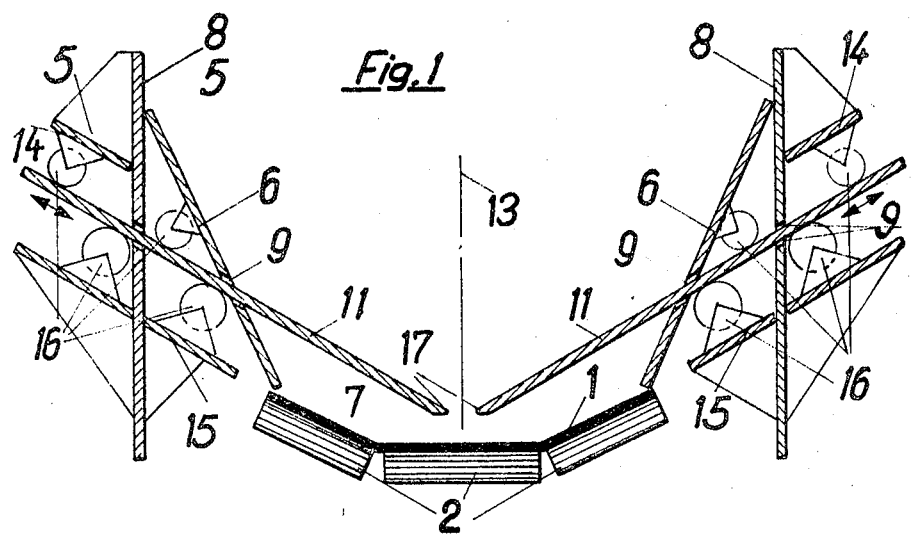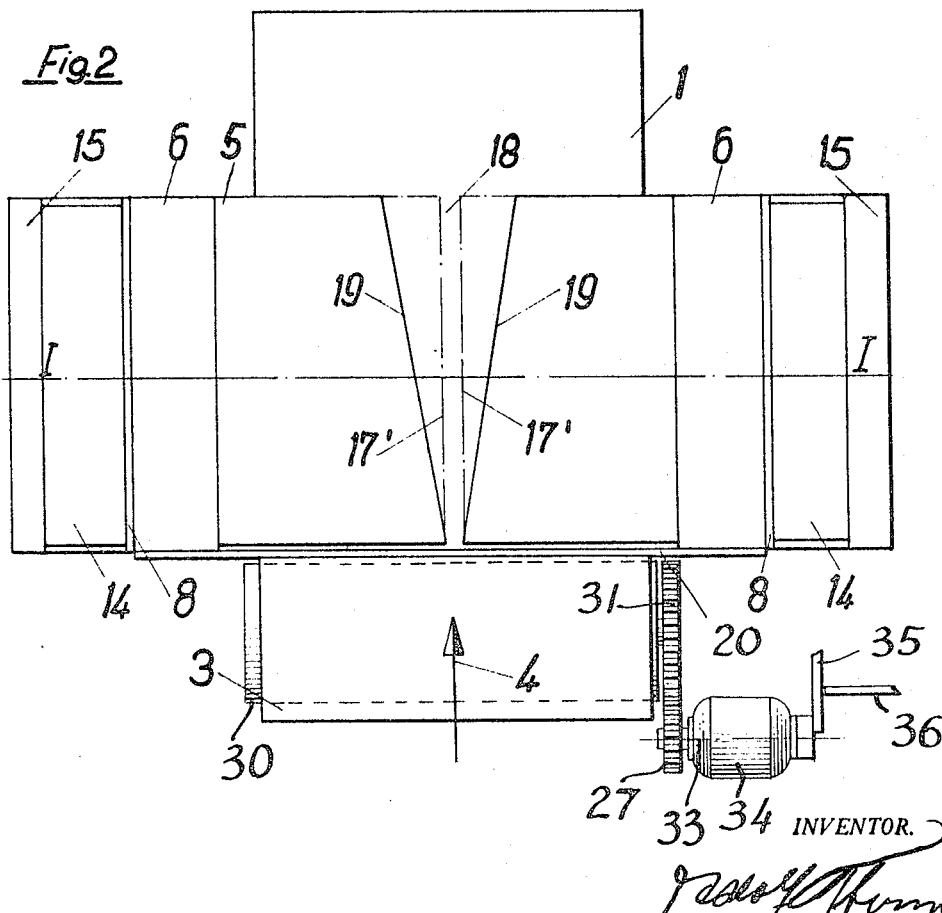

3,464,536
CHARGING DEVICE AT CONVEYOR BANDS FOR A QUARRY
Adolf Thomas, Duisburg, Germany, assignor to Esch-Werke K.G., Duisburg, Germany
Filed June 30, 1967, Ser. No. 650,383
Claims priority, application Germany, Aug. 20, 1966, E 32,323
Int. Cl. B65g 47/18
U.S. Cl. 198—52         3 Claims

ABSTRACT OF THE DISCLOSURE

The present invention relates in general to a charging device at endless conveyor bands in the form of a trough for protecting a rubber conveyor band against falling stones along a great height having a weight of two tons and more, having sharp edges by protecting plates arranged in the trough shortly above the band and means for withdrawing the protecting plates under the stones, whereby the latter can glide slowly onto the band along a little height without effecting any impacts or injuries to or of the band, respectively.

---

The invention relates to a charging device at endless band conveyors for a quarry to which the coarse crude stone work shot off from the quarry wall is to be fed by a shovel dredger directly or by means of a motor car tipper, scraper or the like from a ramp in divided quantities and during a transitory resting condition of the band conveyor.

As with such a charge of the material which can include stones of a length of one metre and a weight of two tons and more to be conveyed, owing to the possible great altitude of fall not to be anticipated, frequently considerable thrust energies will be liberated, it is necessary to form the charging trough and the conveyor band very strong.

In such cases preferably there will be used suitably strong steel plate bands as conveying belt, which show, particularly with greater length, the disadvantage of disproportionate high costs of production and the construction, displacement, working expenses and attendance of which are very expensive.

Band conveyors consisting of rubber or rubberlike material of sufficient thickness of the band suffice for plain feeding work, also with such coarse crude stone agglomeration and are remarkably more economical. However, such band conveyors are too sensitive to the thrust energies called forth by heavy stone lumps, which can easely render the rubber band unserviceable as they frequently show long sharp edges by their sharp edges.

There has been already proposed to protect the conveyor band within the trough against detoriations by means of a protecting plate, being sloped in the feed direction, when being striked by large stone lumps, so that the lumps glide down on the conveyor band. The discharging edge of the protecting plate shows a cutting out.

With this construction the trough or the conveyor band obtains a greater total length and on gliding down of large stone lumps the band does not be exposed to the danger to be damaged by the sharp edges of the stones.

In order to avoid these drawbacks of conveyor bands consisting of rubber of rubberlike material and to render them suitable for the mentioned purpose, the said protecting plate is wholly or partly movably guided in the charge trough in such a way that it below the charged material, can be drawn away.

Hereby it is attained, that the divided quantity of stones falling onto the protecting plate only gradually and careful and with a slight altitude of fall and not suddenly in its whole passes over onto the conveyor band.

For further safeguarding against damaging of the conveyor band the charge, of the stony material onto the band only can be brought about during resting condition of the conveyor band.

This may be attained, by means of a switch lever 35 (FIG. 2) for switching on or off the movement of the conveyor band and a controlorgan 28 (FIG. 3) for drawing away the protecting plate and a locking device 36, 28, 35 between them, whereby drawing away will be prevented as long as the conveyor band is being moving.

On drawing away of the protecting plates, starting the conveyor band, closing of the protecting plate, and stoppings of the conveyor band has to bring about in determined spaces of time one after the other, by hand or a joint control mechanism not shown, for instance a relay set, which keeps the individual devices switched on during the co-ordinated spaces of time, whereby the control mechanism, may be switched on by the charge of the divided quantity of the material to be conveyed itself or simultaneously by hand together with the charge.

The drawing away of the protecting plate or of parts thereof can be effected along all suitable directions, particularly lateral or in the direction of the conveyor band.

Particularly suitable is a construction in which the protecting plate consists of two parts which are movably arranged in plains which cut each other in the vertical longitudinal middle plain of the conveyor band in a line a little above the conveyor band and being directed obliquely outwards and towards above.

Each part of the protecting plates moves through substantially horizontal slits of the lateral walls of the charging trough and may be connected to a driving device in form of a hydraulic unit, rack and pinion gear or a crank mechanism and the like.

Each of the two protecting plate parts is supported by at least two upper and two lower gliding rollers mounted in the frame of the trough, the lower pairs of rollers with respect to the upper pairs of rollers being inwardly displaced.

The free end edges of the two protecting plate parts turned towards each other and in its closing position contact each other or overlap each other, or form a gap between them for the free passage of material below a determined size of corn. The gap between the two free end edges can be enlarged up to the width of the trough by moving the protecting plate parts outwardly.

The boundary edges of the gap between the protecting plates may serviceably diverge from each other in the direction of the movement of the band, in order that during the opening movement of the two-piece protecting plate firstly the front ends and then the back ends of large stone-lumps will be gradually let down on the conveyor band with half of the weight without any impact effect.

An embodiment of the invention now will be described by way of example with reference to the accompanying drawing wherein:

FIG. 1 a vertical section view through the charging trough and the conveyor band and protecting-plate along the line I—I of FIG. 2, and FIG. 2 a plan view including the means for driving the band.

The endless band 1, consisting for instance of rubber or rubber-like material, having a thickness of some centimetres and suitably being provided with an internally steel wire amouring, has a width of about 1.5 m.

Its upper stretch is supported by spaced carrying rollers 1 mounted at the frame construction, not shown, of the conveyor band. At the returning end 3 (FIG. 2) of the band the lower stretch passes over into the upper stretch. The band moves in the direction of the arrow 4 (FIG. 2).

Near the returning end 3 the charging trough 5 is provided and fixed to the frame-construction of the conveyor band. It consists of two fixed oblique lateral walls 6 (FIG. 1) which form between their lower ends an opening 7 which is closed by the band 1.

At each outer side of the walls 6 a vertical wall 8 is fixed. These and the side walls 6 are provided with horizontal slits 9 extending in the direction of the band, in which the two protecting plates 11 can be shifted obliquely downwardly or upwardly, respectively. The plains of the protecting plates 11 cut each other in the middle vertical longitudinal plain 13 of the charging trough 5.

To the vertical walls 8 there are welded plate arms 14 and 15 which are stiffened by struts on which guiding rollers 16 for the protecting plates 11 are mounted. A further guide roller 16 is mounted at the outer sides of each of the side walls 6. To each protecting plates 11 are coordinated, for instance, two upper and two lower guide rollers 16. The lower pairs of rollers 16, with respect to the upper pairs of rollers, being shifted inwardly, in order to diminish bending strain of the protecting plates when being striked upon by heavy stone lumps.

The protecting plates 11 coact with a device for simultaneously moving the protecting plates 11 inwardly or outwardly. This device may consist of an hydraulic cylinder-piston-unit, which is connected with the protecting plates 11, and will bring them simultaneously into the shown closing position or into their opening position, respectively. In the latter, the inner edges 17 of the protecting plates 11 can be drawn back up to the slits 9 of the lateral walls 6.

The inner and lower edges 17 of the plates 11 may be formed according to the dash and dot lines 17' (FIG. 2), i.e. they may form in their closing the position of rest a closed or also an open slit 18 of equal width, whereby small grain, which is of no danger to damaging the rubber band, can directly fall on the conveyor band. By this small grain the band will be protected against following large stone lumps.

Instead of that, the slit gap 18 formed between the two protecting plates 11, may also be increasingly enlarged in the direction of the arrow 4 (FIG. 2) according to the oblique lines 19 (FIG. 2).

During the charge of the material to be conveyed the protecting plates 11 are in their closed position, shown in FIG. 2. Therewith the conveyor band is to be found in its condition of rest.

By this it will be attained that on increasing widening of the gap portion between the edges 19, 19 of the protecting-plate parts 11, first the front end of a large stone-lump is gradually let down through the gap portion below it onto the band with half of its weight, and then also a gradual lowering down of the other end of the stones will be effected in such a way that a pushlike striking of a stone be it ever so large a stone lump, be it ever so large, on the band will be avoided.

The back ends of the vertical walls 8 are, at the exit end of the charging trough 5, connected with each other by a closure wall 20 (FIG. 2).

The returning end 3 (FIG. 2) of the band 1 is drived by a driving roller 30 at which a thoothed wheel 31 is fixed being in mesh with a pinion 27, secured to the axle 33 of the drive motor 34 which can be switched on or off by a switch lever 35. With said switch lever 35 (FIG. 2) which engages or disengages the movement of the band cooperates a locking bar 36 which is locked against axially movement to the left by the means for moving the protecting plates 11 (FIG. 2) as long as the switch lever 35 assumes its engaging position. Moving of the two protection plates 11 (FIG. 1) is effected by means of a rope drive, shown in FIG. 3 which is practically used by the applicant, which comprises a drum-roller 20 which is clasped round by a rope 21 and which runs over a guiding roller 22 back to the drum-roller 20. Another rope 24 is clasped round the drum roller 20 in the opposite direction and is guided by two guiding rollers 25 and 26. Between the guiding roller 22 and the drum-roller 20, on the one hand, and the guiding rollers 25 and 26, on the other hand, ropes 21 and 24 carry each a tappet 23 which are fixed each to the related protecting plates 11 (FIG. 1). The drum-roller 20 is provided with a toothed wheel 26' (FIG. 3) which is in mesh with a pinion 27, rigidly connected to said drive lever 28. Upon turning the latter in either direction the tappets 23 and the two protecting plates 11 connected therewith will be moved always in opposite directions. When the drive lever 28 is turned in the direction of arrow A (FIG. 3) the left protecting plate 11 moves to the left and the right protecting plate to the right and vice versa. In order to bring the two protecting plates 11 into their inner closing position in which the band 1 is covered up by the plates 11 against falling stones the drive lever 28 is to turn in the direction of the arrow B.

Said locking bar 36 cooperates with an arm 27' (FIG. 3) at the drive lever 28 in such a way that on the turning of the drive lever 28 and the arm 27' in the direction of arrow B the arm 27' strikes the end of the locking bar 36 and tries to move it axially. That will be prevented, when the switch lever 35 (FIG. 2) for the band lies in the way of the locking bar 36, i.e. the protecting plates 11 can only be moved into there open position, when the band is disengaged.

When the divided material quantity has been moved out of the charging trough the conveyor band will be stopped again, for instance by means of a spring influenced second feeling member in the form of a band carrying roller which effects switching off of the band on its return to its position of rest.

In such a way the conveyor band will be loaded without noticeable gaps and it will be avoided, that it must be driven more as necessary.

Instead of such controlling or drawing away the protecting plate parts, starting of the conveyor band and stopping of it, following one after the other, can be effected by the dredgerman by hand, for instance, by pressing on call buttons one after the other which are coordinated to the related different devices.

For the whole charging of one divided quantity of stone material to be conveyed until the next charge, there will be necessary about the following spans of time:

| | Seconds |
|---|---|
| For drawing away the protecting plate | 2 or more |
| Starting the conveyor band | 3 |
| Feeding the charged material until closing the protecting plate | 18 |
| Stopping the conveyor band | 3 |
| Interval until next charging | 1 |

This total proceeding for charging one divided quantity of stony material may also be effected entirely automatically in that the steps for the individual parts of the total proceeding is effected by a joint controlling device for instance a relay-set, which keeps switched on the related devices during the time periods allotted thereto and controls the proper sequence of action of the individual devices and means and whereby controlling can be initiated directly through the first charge of the divided quantity or at the same time with the charge by switching by hand.

What I claim is:

1. A device adapted to straddle a conveyor band and for charging material thereon; comprising a pair of vertical spaced walls; a support means for the said vertical walls; a vertical inclined wall secured to each of said vertical walls; each of the walls having a slot therein; a pair of protective plates, one of each of the said plates slidably mounted in the slots of one of each of said vertical and inclined vertical walls; the slot of the vertical wall be positioned vertically above the slots of the vertical inclined walls so that the said protecting plates are positioned on an incline, the inner edge of the plate being in a lower vertical position than the outer edge thereof; guide rollers for slidably mounting said protecting plates, means for supporting said rollers; and means for moving said protective plates toward and away from each other.

2. A device as set forth in claim 1 wherein the inner edges of said protecting plates diverge from each other in the direction of the travel of the conveyor band and form a triangle gap when the adjacent ends of the inner edges of the protecting plates are moved in an abutting position.

3. A device as set forth in claim 1 in combinations with a conveyor band; comprising a means for driving said conveyor band; a lever for actuating said means; and a locking means to prevent the said means for moving the said protecting plates while the said conveyor band is being moved.

References Cited

UNITED STATES PATENTS 3,300,023    1/1967    Creutzmann _____ 198—53

FOREIGN PATENTS 369,324    3/1932    Great Britain.

RICHARD E. AEGERTER, Primary Examiner